United States Patent Office 3,172,914
Patented Mar. 9, 1965

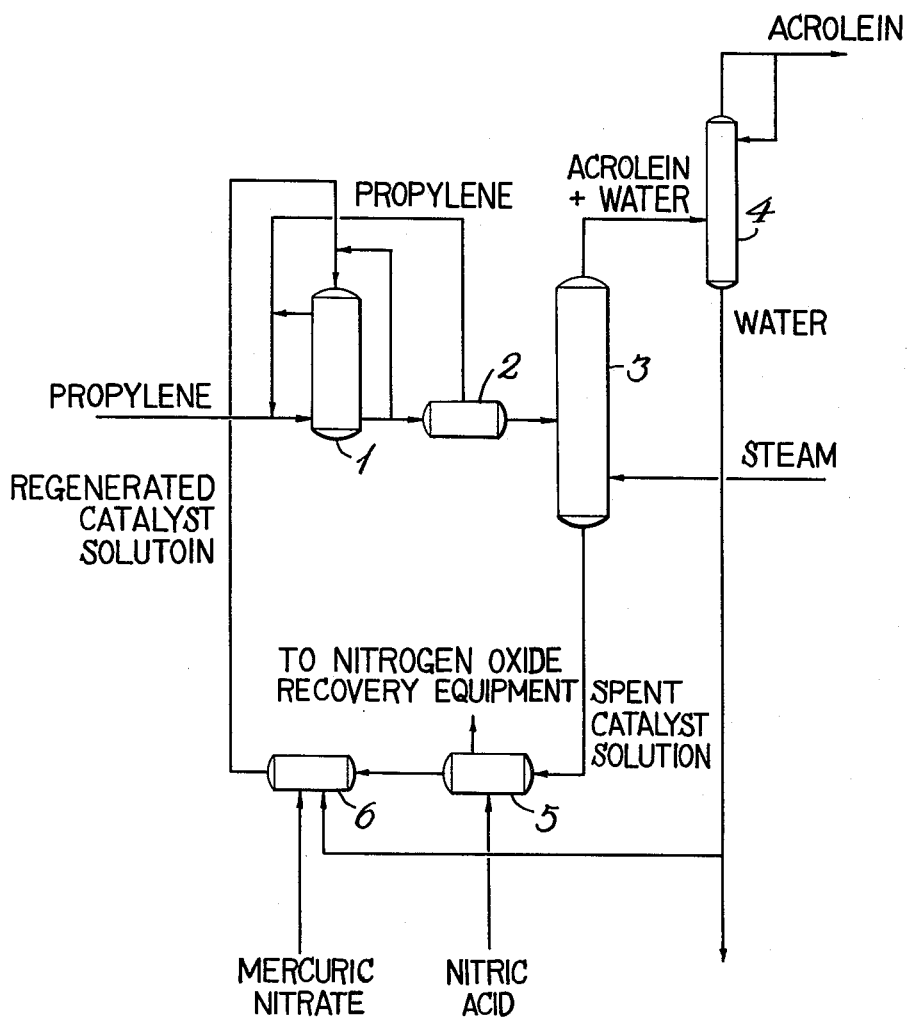

3,172,914
PROCESS FOR PREPARING CARBONYL COMPOUNDS FROM OLEFINIC HYDROCARBONS
Yasuo Fujiwara, Suginami-ku, Tokyo, and Sumi Masaki, Fujisawa-shi, Kanagawa-ken, Japan, assignors to Nippon Sekiyu Kabushiki Kaisha, Tokyo, Japan, a corporation of Japan
Filed Jan. 29, 1962, Ser. No. 169,498
Claims priority, application Japan, June 5, 1961, 36/19,977
6 Claims. (Cl. 260—597)

This invention relates to a process for preparing carbonyl compounds by liquid-phase catalytic oxidation of olefinic hydrocarbons. It has been known in U.S. patents (U.S. 2,197,258, U.S. 2,270,705, U.S. 2,289,966, U.S. 2,334,091) that unsaturated carbonyl compounds are obtained directly from olefinic hydrocarbons, for example, acrolein from propylene, by using mercuric sulfate as oxidizing agent.

By the addition of water to mercuric sulfate, oxidizing agent, hydrolysis takes place in the absence of sulfuric acid and basic salt is formed. It is described in these patents that this basic mercuric sulfate has no activity to produce acrolein from propylene and therefore the presence of sulfuric acid is absolutely necessary.

However, the presence of sulfuric acid has various disadvantages. Sulfuric acid tends to react with propylene in the course of reaction, is apt to cause the destruction of produced acrolein and decreases the solubility of mermuric sulfate in the solution. It is an additional defect that mercuric sulfate is reduced by propylene as reaction proceeds and insoluble mercurous sulfate precipitates. Although many methods for regenerating mercurous sulfate into mercuric sulfate have been proposed, all of them are rather troublesome to operate.

It is an object of this invention to remove these defects in preparing carbonyl compounds from olefinic hydrocarbons by replacing mercuric sulfate with its nitrate.

It is another object of this invention to change the yield of reaction products, based on olefin consumed, by adding nitrate of iron or silver into the catalyst solution.

It is a further object of this invention to produce acrolein and acetone from propylene continuously by using methods of this invention.

As the result of our research, we found that if mercuric nitrate is used as a component of the catalyst solution, it is possible to produce acrolein from propylene even in the absence of nitric acid in the catalyst solution. We also found out that catalytic oxidation can be similarly carried out by using an aqueous suspension or nitric acid solution of mercuric nitrate.

According to our invention, when propylene is brought into contact with the catalyst solution in which mercuric nitrate is suspended in water, one mole of mercuric nitrate combines with one mole of propylene to form complex compound and suspension becomes homogeneous solution. When this complex compound is heated, hydrolysis occurs easily and propylene, the ligand of the complex compound, is oxidized into acrolein. Simultaneously the bivalent mercury is reduced to metallic mercury or a compound containing univalent mercury. Entirely the same result is obtained when the catalyst solution is heated at first above the temperature at which hydrolysis takes place and thereafter propylene is fed into the solution. When nitric acid solution of mercuric nitrate is used as the catalyst solution, the catalytic oxidation proceeds as a liquid-phase homogeneous reaction.

When propylene is oxidized into acrolein, a small amount of acetone and propionaldehyde is produced along with acrolein. When isobutylene is oxidised, tertiary butyl alcohol and isobutyraldehyde are obtained in addition to methacrolein and in the case of oxidation of n-butylenes methyl vinyl ketone and methyl ethyl ketone are predominantly produced.

The carbonyl compounds obtained are separated by using distillation of the catalyst solution. The catalyst solution, which was reduced as the oxidation proceeds, is easily regenerated into mercuric nitrate for reuse by conventional methods such as oxidation by nitric acid. As compared with mercurous sulfate, reduced mercury has the advantage of being easily regenerated. Nitrogen oxide gas evolved in the regeneration process is recovered by oxygen or oxygen-containing gas and water into nitric acid.

By our further research we discovered that it is possible to change the yield of reaction products, based on olefin consumed, in a wide range by adding nitrate of iron or silver into the said catalyst solution, that is, aqueous suspension of mercuric nitrate or nitric acid solution of mercuric nitrate.

In the case of propylene oxidation by the above mentioned catalyst without nitrate of iron or silver, for example, the selectivity of acrolein is about 90 wt. percent, but when nitrate of iron or silver is present in the catalyst solution, the selectivity of acrolein and propionaldehyde can be decreased and the selectivity of acetone can be increased up to even 100 wt. percent. If nitrate of iron or silver is used without mercuric nitrate in the catalyst solution, we can not obtain a slightest amount of carbonyl compounds.

The following tables show the influence of molar ratio of ferric nitrate and silver nitrate to mercuric nitrate on the composition of carbonyl compounds obtained by the same procedure described in Example V and VI.

| $Fe^{+++}/Hg^{++}$ Molar Ratio | Composition of Carbonyl Compounds (wt. percent) | | |
|---|---|---|---|
| | Acrolein | Acetone | Propionaldehyde |
| 0.00 | 91.2 | 8.0 | 0.8 |
| 0.10 | 44.0 | 56.0 | trace |
| 0.56 | 9.0 | 91.0 | 0.0 |
| 1.00 | 0.0 | 100.0 | 0.0 |
| 3.00 | 0.0 | 100.0 | 0.0 |

| $Ag^+/Hg^{++}$ Molar Ratio | Composition of Carbonyl Compounds (wt. percent) | | |
|---|---|---|---|
| | Acrolein | Acetone | Propionaldehyde |
| 0.00 | 91.2 | 8.0 | 0.8 |
| 2.00 | 13.8 | 86.2 | 0.0 |
| 3.00 | 0.0 | 100.0 | 0.0 |

A continuous production of acrolein from propylene using mercuric nitrate as catalyst solution is explained with reference to the drawing.

Propylene is fed to the bottom of absorption column 1 and catalyst solution, consisting of mercuric nitrate and water, is sprayed downwards from the top of the column to produce complex compound of mercuric nitrate and propylene. Unreacted propylene gas withdrawn from the top of the absorption column is recycled. Propylene absorption column is not limited to a spray tower. Any other reactors in which propylene is brought into contact with catalyst solution, may possibly be used.

The catalyst solution at the bottom of the absorption column, a part of which may or may not be recycled, is transferred to decomposition tank 2 where the complex compound in the catalyst solution is decomposed into acrolein by heating to the temperature where hydrolysis easily proceeds, for example, to 70° C. During the decomposition process, a part of propylene combining to mercuric nitrate is not hydrolyzed and is evolved as gas which is recycled and reused together with unreacted propylene from the top of the absorption column.

After decomposition, the catalyst solution containing acrolein is sent to stripper 3 and azeotropic mixture of acrolein and water is withdrawn from the top of the column, while spent catalyst solution containing mercury compounds of lower state of oxidation is removed from the bottom of the column. Azeotropic mixture of acrolein and water then enters into the low-temperature extractive distillation column 4 to obtain acrolein of high purity from the top of the column. Acetone and propionaldehyde are further separated by azeotropic distillation using chloroform.

The spent catalyst solution is oxidized by nitric acid in catalyst regeneration tank 5. Nitrogen oxide gas which is evolved from the regeneration tank is oxidized with oxygen or oxygen-containing gas in the recovery equipment, thereafter it is absorbed by water to obtain nitric acid. The recovered mercuric nitrate solution is adjusted to specified composition of catalyst solution by using fresh mercuric nitrate in catalyst preparation tank 6 and is reused in the reaction.

By the same process and condition acetone is produced when the catalyst solution, consisting of mercuric nitrate and nitrate of iron or silver, is used.

Examples of how the invention may be carried out are shown by the following.

*Example I*

A catalyst solution, consisting of 33 gr. of mercuric nitrate suspended in 50 cc. of water, is filled in a 200 cc. glass reactor equipped with a stirrer, a thermometer, a tube for feeding olefin gas and a gas outlet. Then the catalyst solution is stirred vigorously. Propylene gas of 90 vol. percent purity (the rest 10% is propane) is fed into the reactor under the condition of 25° C. and 1 atm.

The flow rate of propylene is maintained at 150 cc. per minute during the reaction. Mercuric nitrate forms an equimolar complex compound with propylene and suspension becomes homogeneous. Absorption of propylene into the catalyst solution is not observed after about 30 minutes and the temperature of the catalyst solution is maintained at 70° C. for 3 hours to decompose the complex compound. The catalyst solution becomes turbid due to the reduction of mercuric nitrate and the precipitation of metallic mercury and mercurous compound. The reaction products are separated by distillation and analyzed by gas chromatography. The yield of acrolein, acetone and propionaldehyde, based on propylene consumed, is 91.2, 8.0 and 0.8 wt. percent respectively. Metallic mercury precipitated by reduction is 13.1 gr.

*Example II*

When a catalyst solution, in which 33 gr. of mercuric nitrate is dissolved in 50 cc. of 2 N nitric acid, is used in the same method and under the same condition as Example I, the yield of acrolein, based on propylene consumed, is 90.4 wt. percent, acetone 9.0 wt. percent, propionaldehyde 0.6 wt. percent.

*Example III*

When isobutylene of 99 vol. percent purity is oxidized using the procedure described in Example I, the yield of methacrolein, based on isobutylene consumed, is 80.0 wt. percent, tertiary butyl alcohol 18.2 wt. percent and isobutyraldehyde 1.8 wt. percent.

*Example IV*

When n-butylenes (butene-1 29.0 vol. percent, trans-butene-2 39.5 vol. percent, cis-butene-2, 30.5 vol. percent) is oxidized using the same procedure described in Example I, the yield of methyl vinyl ketone, based on n-butylenes consumed, is 34.0 wt. percent and that of methyl ethyl ketone is 66.0 wt. percent.

*Example V*

A complex compound is prepared by reacting propylene of 90 vol. percent purity (the rest 10% is propane) with the catalyst solution in which 33 gr. of mercuric nitrate and 23 gr. of ferric nitrate are suspended in 50 cc. of water. The decomposition reaction of the above mentioned complex compound is carried out at 70° C. for 3 hours to obtain carbonyl compounds. The yield of acrolein, based on propylene consumed, is decreased to 9.0 wt. percent and that of acetone is increased to 91.0 wt. percent.

*Example VI*

34 gr. of silver nitrate is used in place of ferric nitrate in Example V, the composition of carbonyl compounds obtained is 13.8 wt. percent acrolein and 86.2 wt. percent acetone.

We claim:
1. A process for preparing acetone which comprises reacting propylene with an oxidizing agent essentially consisting of an aqueous suspension of mercuric nitrate and ferric nitrate to form a complex between propylene and mercuric nitrate, decomposing said complex by heat and recovering acetone produced thereby, the molar ratio of ferric nitrate to mercuric nitrate being above about 0.1.

2. A process as defined in claim 1, wherein propylene is initially brought into contact with the oxidizing agent to form a complex compound of mercuric nitrate and propylene at a temperature in the range from 0° C. to 50° C. and thereafter the said oxidizing agent is heated to a temperature ranging from 50° C. to 180° C. where decomposition of the complex compound readily proceeds to yield acetone.

3. A process as defined in claim 1, wherein an oxidizing agent is initially heated to a temperature in the range from 50° C. to 180° C. and then propylene is brought into contact with the hot oxidizing agent to cause the formation and the decomposition of the complex compound of mercuric nitrate and propylene simultaneously to yield acetone.

4. A process for preparing acetone which comprises reacting propylene with an oxidizing agent essentially consisting of a nitric acid solution of mercuric nitrate and ferric nitrate to form a complex between propylene and mercuric nitrate, decomposing said complex by heat and recovering acetone produced thereby, the molar ratio of ferric nitrate to mercuric nitrate being above about 0.1.

5. A process as defined in claim 4, wherein propylene is initially brought into contact with the oxidizing agent to form a complex compound of mercuric nitrate and propylene at a temperature in the range from 0° C. to 50° C. and thereafter the said oxidizing agent is heated to a temperature ranging from 50° C. to 180° C. where decomposition of the complex compound readily proceeds to yield acetone.

6. A process as defined in claim 4, wherein an oxidizing agent is initially heated to a temperature in the range from 50° C. to 180° C. and then propylene is brought into contact with the hot oxidizing agent to cause the formation and decomposition of the complex compound of mercuric nitrate and propylene simultaneously to yield acetone.

References Cited by the Examiner

UNITED STATES PATENTS

| | | | |
|---|---|---|---|
| 2,334,091 | 11/43 | Herstein | 260—604 |
| 2,398,685 | 4/46 | Yale et al. | 260—597 |
| 3,020,293 | 2/62 | Schonberg et al. | 260—604 XR |

OTHER REFERENCES

Mertz et al.: Proc. of the Oklahoma Acad. of Science for 1949, vol. 30, pp. 134–6.

JOSEPH R. LIBERMAN, *Primary Examiner.*

LEON ZITVER, *Examiner.*